United States Patent [19]

Hallenbeck et al.

[11] Patent Number: 4,829,222

[45] Date of Patent: May 9, 1989

[54] STEPPER MOTOR DRIVER CONTROL CIRCUIT

[75] Inventors: Richard A. Hallenbeck, Wilton; Minh Q. Tu, Bethel, both of Conn.

[73] Assignee: Pitney Bowes Inc., Stamford, Conn.

[21] Appl. No.: 87,138

[22] Filed: Aug. 19, 1987

[51] Int. Cl.$^4$ .............................................. H02P 8/00
[52] U.S. Cl. ..................................... 318/696; 318/685
[58] Field of Search ................................ 318/696, 685

[56] References Cited

U.S. PATENT DOCUMENTS

| | | | |
|---|---|---|---|
| 3,893,012 | 7/1975 | Lin ....................................... | 318/696 |
| 4,490,665 | 12/1984 | Meyer et al. ........................ | 318/696 |
| 4,574,228 | 3/1986 | Blue et al. ........................... | 318/696 |

Primary Examiner—William M. Shoop, Jr.
Assistant Examiner—Saul M. Bergmann
Attorney, Agent, or Firm—Charles G. Parks, Jr.; David E. Pitchenik; Melvin J. Scolnick

[57] ABSTRACT

A driver circuit is under the control of a microprocessor and in communication with a stepper motor. The stepper motor is in driving communication with a mechanism. A power source having a first and second voltage level is in communication with the stepper motor such that the first voltage level is in direct communication with the power terminal of the stepper motor. The second voltage level can be selectively applied to the power terminal of the stepper motor upon instruction of the microprocessor to a gate circuit of the driver circuit. The driver circuit also includes a gating amplifier having a plurality of stages, each stage in communication with a respective one of the stepping terminals of said stepper motor. A coupling circuit means is provided for receiving a series of step commands from said microprocessor and turning "ON" or "OFF" a respective stage of said gating amplifier in accordance with a respective step command in the form of a binary set number.

6 Claims, 4 Drawing Sheets

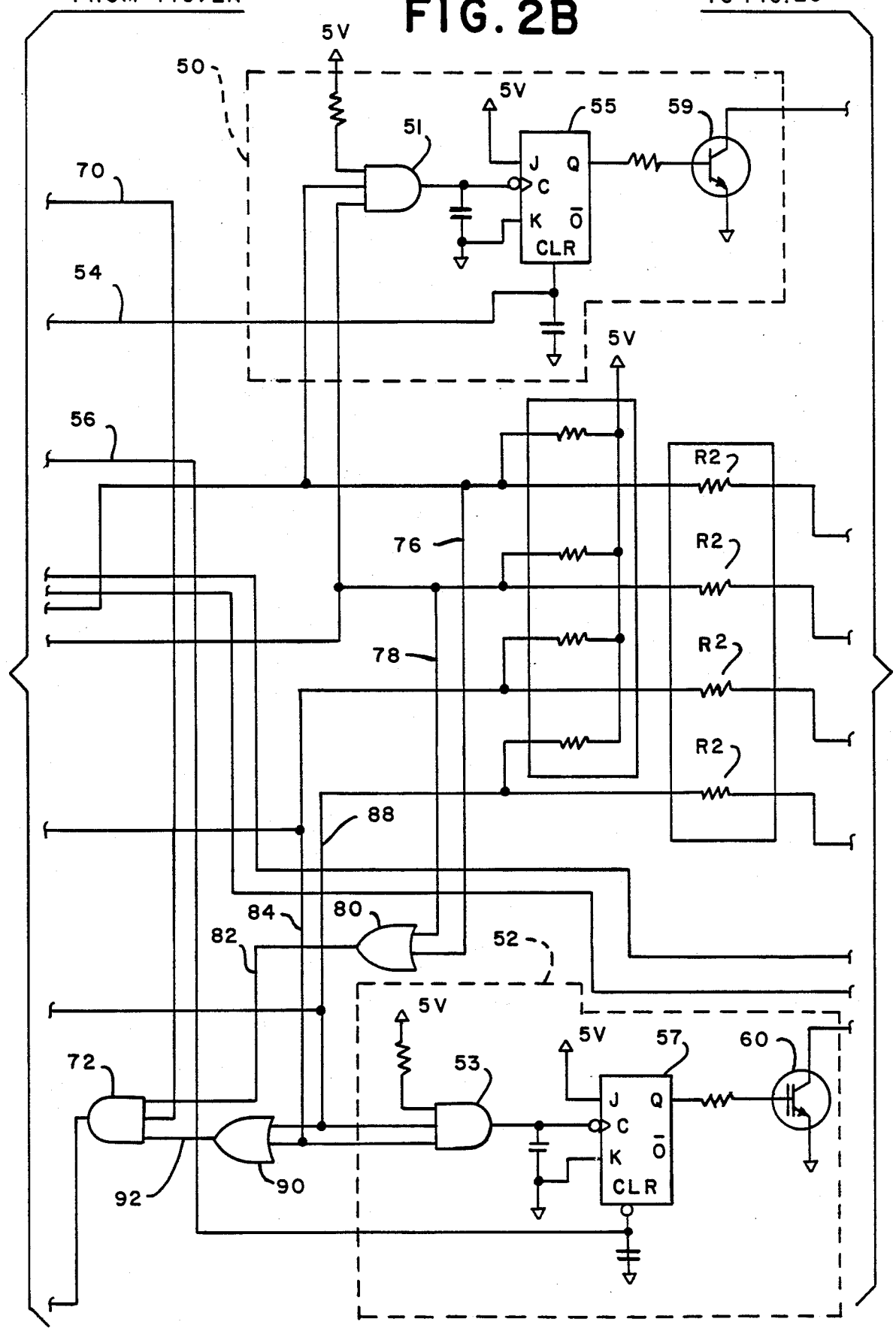

STEPPER MOTOR DRIVER CONTROL CIRCUIT

BACKGROUND OF THE INVENTION

This invention relates to motor driver circuits and, more particularly, to a driver circuit for driving a stepper motor wherein the driver circuit is responsive to a microprocessor.

Generally, stepper motors have increasingly been the prime mover of choice in preference over conventional DC motors for many applications. One reason for the increased employment of stepper motors is the ability to precisely control the displacement of a stepper motor without the need of employing elaborate servo-control systems.

Conventionally, a stepper motor advances in a stepwise fashion in response to actuation of a specific combination of internal switches, i.e., gating, thereby causing the stepper motor's output shaft to radially displace a discrete radial distance, i.e., step. Contiguous rotation is achieved by applying a prescribed gating sequence to the stepper motor. The stepper motor is also subjected to a given electrical current level relatable to the maximum torque output of the stepper motor, the speed of the stepper motor being a function of the time interval between steps.

Conventionally, the stepping sequence for an associated stepper motor is stored in a memory associated with the microprocessor which is in directing communication with a driver circuit. The driver circuit under the direction of the microprocessor gates the stepper motor to cause the desired rotational displacement, direction and speed of the stepper motor. The driver circuit is also in communication with a current/voltage source for directing current to the stepper motor under the direction of the microprocessor.

In certain applications, here of particular interest, in postage meter mailing machine applications, it is desirable for the stepper motor to drive a mechanism which must be rapidly accelerated to a desired speed. For example, in postage meter mailing machine application, a postage meter print drum assembly must be rapidly accelerated from a rest position to the required printing speed and subsequently decelerated to a stop between each print cycle. Rapid acceleration of the print drum assembly requires the stepper motor to deliver during initial displacements, i.e., acceleration of the print drum assembly, high amounts of torque in order to overcome sufficiently the inertial resistance of the print drum assembly in addition to driving a traversing mailpiece. Therefore, it is necessary to employ an upsized motor in order to achieve sufficiently high torque during print drum acceleration. However, the need for high torque represents only a small fraction of the stepper motor's operating cycle time. It is noted that because of spacial constraints, the use of large motors in such applications is undesirable. As a result, a compromise is present between motor size, promoting higher acceleration rates, and spacial constraints relative to desired postage meter mailing machine through-put. Further, large motors represent an increased cost factor.

SUMMARY OF THE INVENTION

It is an objective of the present invention to present a driver circuit means for driving a stepper motor in such a manner as to derive increased torque output for a given size stepper motor during the acceleration of the stepper motor without substantially affecting the working life of the stepper motor.

It is a further objective of the present invention to present present a driver circuit responsive to a microprocessor for driving a stepper motor and in communication with a voltage source. The voltage source can supply at least a high and low voltage level. The driver circuit has the capability of selectively gating either the high or low voltage to the stepper motor upon the direction of the microprocessor.

The driver circuit is responsive to a microprocessor for proper gating of a stepper motor. The driver circuit also selectively gates to the power terminals of the stepper motor at least one of two voltages supplied by a voltage source in response to the microprocessor directives. The driver circuit further keeps the microprocessor continuously informed of the current voltage level being supplied to the stepper motor.

Generally, the driver circuit includes an optical coupling circuit which is in line communication with the microprocessor for receiving gating instructions from the microprocessor. The optical circuit is also in line communication with a multi-stage gating amplifier. Each stage of the gating amplifier is in line communication with a respective gating terminal of the stepper motor for gating of the stepper motor in response to the instructions received by the optical circuit. The driver circuit further includes a power gate circuit. The driver circuit is coupled to a voltage source having the capability of supplying at least two voltage levels. One voltage level from the voltage source is directly applied to the power terminals of the stepper motor and a second voltage is coupled to the power gate circuit. The power gate circuit when turned "ON" by the microprocessor to direct the second voltage level to the power terminals of the stepper motor in an additive fashion to the first voltage level. The microprocessor is continuously informed of the operating state of the driver circuit and stepper motor by the driver circuit.

BRIEF DESCRIPTION OF THE DRAWINGS

FIGS. 2A, 2B and 2C are a schematic representation of a driver circuit in accordance with the present invention.

DETAILED DESCRIPTION OF THE PREFERRED EMBODIMENT

Figure 1:
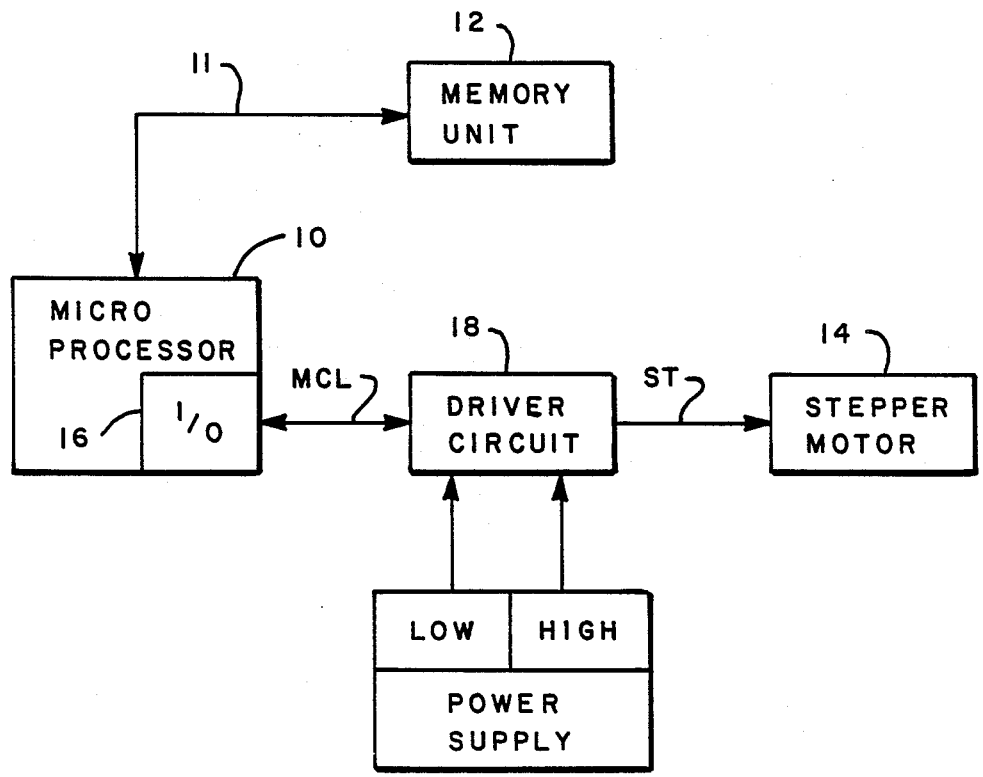
FIG. 1 is a schematic representation of a microprocessor and driver circuit for driving a stepper motor in accordance with the present invention.

Referring to FIG. 1, a generally conventional microprocessor 10 is in informed line communication with a memory unit 12 through bus lines 11 in a known manner. Residing in the memory unit 12 is the stepping sequence table for a stepper motor 14. The microprocessor 10 directs an input-output (I/O) unit 16 which in turn is in line communication with the driver circuit 18 through bus MCL (hereafter the memory unit, microprocessor and I/O unit are also collectively referred to as microcomputer). The driver circuit 18 is in line communication, generally indicated here as ST, with the stepper motor 14.

Figure 2A:
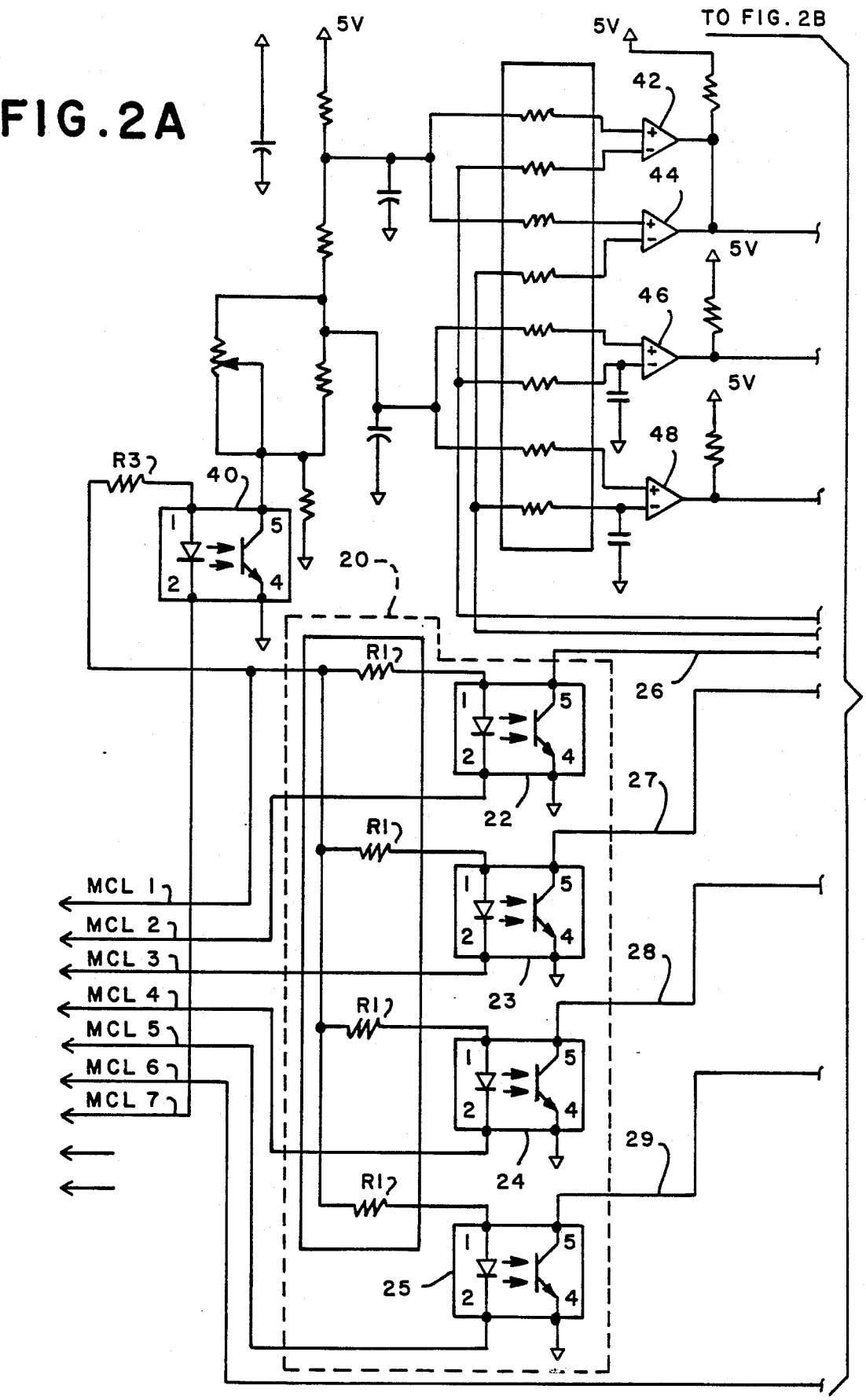
Figure 2C:
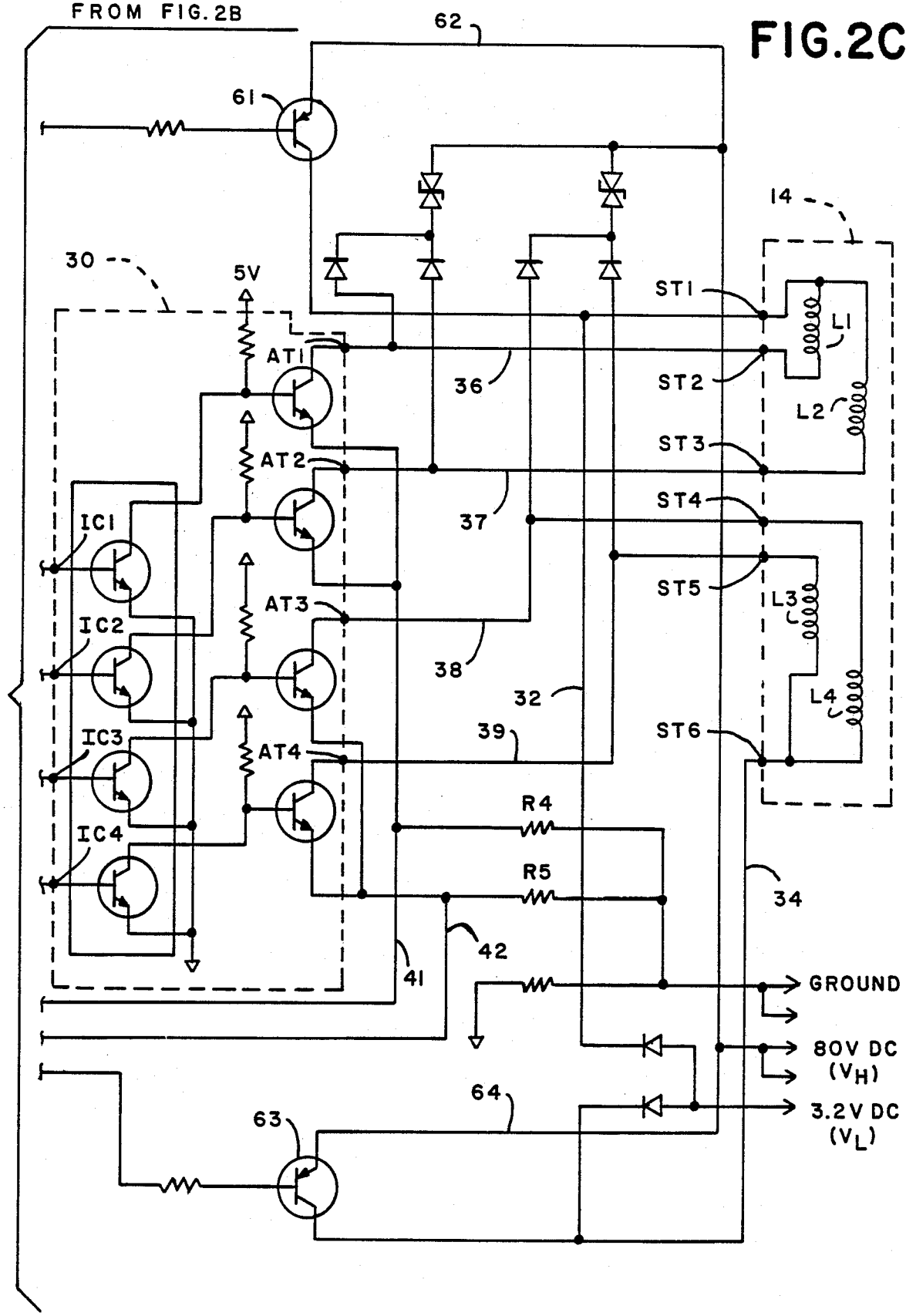

Referring more particularly to FIGS. 2A, 2B and 2C, the microprocessor 10 is in line communication via bus lines MCL1–MCL7 with the driver circuit 18. An optical coupling circuit 20 includes a plurality of optical isolators 22–25, each having terminal leads 1–2 and 4–5. MCL1 communicates terminal lead 1 of each optical isolator through a respective resistor R1 to the microprocessor 10. Terminal 2 of respective optical isolators 22–25 are in communication with the microprocessor 10 through respective lines MCL2–MCL5. Terminal 4 of each optical isolator 22–25 is grounded and Terminal 5 of respective optical isolators 22–25 a communicates with respective lines 26–29 which lines are received by the control input side of an multi-stage gating amplifier 30 (respective terminals IC1–IC4) through respective resistors R2.

The stepper motor 14, schematically indicated by inductance coils L1–L4, has six terminals ST1–ST6, ST1 and ST6 being power terminals and ST2–ST5 being switching terminals. A low voltage $V_L$, from a voltage source (not shown), is directed to the stepper motor power terminals ST1 and ST6 through respective lines 32 and 34. Terminals ST2–ST5 communicate with respective stages of the gating amplifier 30 through respective amplifier terminals AT1–AT4 via, respective, lines 36–39. The amplifier 30 includes output line 41 directed to reference comparators 44 and 48 via resistor R4 and to ground, and output line 42 directed to reference comparators 42 and 46 and via a resistor R5 to ground.

The microcomputer is programmed to provide a binary message sequence or gate instruction through lines MCL1–MCL5. To illustrate, a binary message set {1, 0, 0, 0, 0} causes optical isolators 22–25 to be turned "ON" are turned "OFF" which causes a low to be applied to gating amplifier terminals IC1–IC4. In response thereto, gating amplifier 30 gates terminals AT1–AT4 to ground through respective resistors R4 and R5, and thereby gates coils L1–L4 on (energizes them) by completing the current path of the low voltage $V_l$ through the respective coil to ground.

It should now be appreciated that by changing the gate instruction, the particular coil state L1, L2, L3 and/or L4 is effected, for example, a binary message set {1, 0, 1, 0, 1} through MCL1–MCL5 results in coils L2 and L4 being in a de-energized state and the remaining coils L1 and L3 to be energized.

The driver circuit 18 also is provided with the capability to provide the stepper motor 14 with a high voltage $V_H$ from the power supply to stepper motor terminals ST1 and ST6 under the control of the microprocessor 10.

Power gate circuits 50 and 52 control via transistors 61 and 63 the application to and removal of high voltage from motor terminals ST1 and ST6, respectively. Respective outputs of optical isolators 22–25 under direction of lines MCL2–MCL5 control power gate circuits 50 and 52 to cause the application of the high voltage $V_H$; and an optical isolator 40 and comparators 46 and 48 control power gate circuits 50 and 52 to interrupt or prevent the application of the high voltage $V_H$ under the direction of line MCL7 from microprocessor 10.

Each power gate circuit 50 and 52 includes a flip-flop 55 and 57, a transistor 59 and 60, and an AND gate 51 and 53, the respective output of which is coupled to the clock input of the respective flip-flop 55, 57. The J input to each flip-flop is coupled to +5 volts. Flip-flops 55 and 57 are clocked by a negative-going edge which causes the Q output thereof to go high. A low level at the CLR input of each flip-flop 55, 57 causes the Q output thereof to go low.

As mentioned, the high voltage $V_H$ is applied first (together with the low voltage $V_L$) to accelerate the motor, and then the high voltage $V_H$ is removed and only the low voltage $V_L$ is applied. When the motor is stationary, no voltage is applied to coils L1–L4, and optical isolators 22–25 (FIG. 1A) are "OFF", which produces a high on output lines 26–29 thereof, respectively. Since lines 26 and 27 are coupled to AND gate 51 in power gate circuit 59 and since lines 28 and 29 are coupled AND gate 53 in power gate circuit 52, the outputs of AND gates 51 and 53 are high when optical isolators 22–25 are "OFF", and the respective Q outputs of flip-flops 55, 57 are low. Upon command from microprocessor 10 to apply voltage to motor 14, at least one of lines MCL2–MCL5 goes high to turn a corresponding optical isolator or isolators 22–25 "ON". For example, when line MCL2 goes high, optical isolator 22 is turned "ON". which causes line 26 to go low. A low on line 26 causes the output of AND gate 51 to go low, and the negative edge of the transition at the output of AND gate 51 from high to low clocks flip-flop 55, which turns transistors 59 and 61 "ON", to apply the high voltage $V_H$ to ST1 via transistor 61. The low voltage $V_L$ is also applied to motor terminal ST1 via line 32. At the same time, gating amplifier 30 switches terminal AT1 to ground to complete the current path from both the high $V_H$ and low $V_L$ voltages through coil L1 to ground via resistor R4.

Current in coils L1–L4 is sensed by resistors R4 and R5 which, as mentioned, complete the current path through a respective coil L1–L4 and a respective gate terminal AT1–AT4 to ground. Lines 41 and 42 couple one end of resistors R4 and R5 to the signal inputs of comparators 42 and 46, and comparators 44 and 48, respectively. Optical isolator 40 determines the reference voltage to which comparators 42, 44, 46 and 47 compare the voltage across respective resistors R4 and R5. When current through resistors R4 and R5 exceeds the respective reference voltage provided to comparators 46 and 48, the respective comparator is turned "OFF" to provide a low level on respective lines 54, 56 to the respective CLR input of the respective flip-flop 55, 57, which in turn causes the respective power gate circuit 50, 52 to interrupt the application of the high voltage.

Line MCL1 from microprocessor 10 is coupled to terminal 1 of optical isolator 40 through resistor R3, and line MCL7 is coupled to terminal 2 of isolator 40. Microprocessor 10 outputs a low on line MCL7 when a high voltage is to be applied to the motor and a high at other times. A low on MCL7 turns optical isolator 40 off and provides a higher reference voltage to comparators 46 and 48 which in turn allows a higher current in resistors R4 and R5, and hence in coils L1–L4, before the respective comparator 46, 48 is triggered. The microcomputer transmits a binary set {1,0} on respective microprocessor lines MCL1 and MCL7, respectively, to interrupt the application of the high voltage. This turns optical isolator 40 "ON", which causes the reference voltage to comparators 46 and 48 to essentially go low. Comparators 46 and 48 can then be triggered off by a low current value through resistors R4 and R5, which is exceeded when the high voltage is applied to the coils.

It should be apparent that when the high voltage $V_H$ is directed to the stepper motor 14, the stepper motor will be influenced by a corresponding high current resulting in a high torque output. In like matter, low voltage results in a low current influence on the stepper motor to produce a low torque output.

Circuitry is provided to inform microprocessor 10 of the voltage state being applied to the motor. Terminals 5 of optical isolators 22 and 23 are coupled to OR gate 80 via lines 76 and 78, respectively, and terminals 5 of optical isolators 24 and 25 are coupled to OR gate 90 by lines 28 and 29, respectively. The output of OR gate 80 is coupled to one input of AND gate 72 through line 82, and the output of the OR gate 90 is coupled with another input of AND gate 72 through line 92. The output of AND gate 72 is coupled to MCL6. Therefore, when comparators 42 and 44 are high and an appropriate gating signal is being delivered to the gating amplifier 30, or gate 80 and 90 are turned "ON" resulting in AND gate 72 being turned "ON" and, thereby, actuating line MCL6 high to the microprocessor. By monitoring the state of line MCL6, the microprocessor is informed of the voltage state being applied to the stepper motor pursuant to direction.

During operation of the stepper motor 14 at the low voltage, optical isolator 40 is "ON", which causes essentially low levels to be applied to the reference voltage input of comparators 42, 44, 46 and 48, and the output of comparators 42 and 44 is low, thereby causing the AND gate 72 to turn "OFF" resulting in line MCL6 going low. Therefore, when the microprocessor 10 is instructing the driver 18 to accelerate, line MCL7 will go high turning "OFF" optical isolator 40 and applying a higher reference voltage to comparators 42, 44, 46 and 48 such that the output of comparators 42 and 44 is high, which turns AND gate 72 "ON" as long as appropriate gate signals are applied, which produces a high on line MCL6. During all other operating times of the stepper motor 14, line MCL6 will be low. Should there be a failure of the stepper motor 14, line MCL6 will go low upon instruction of the microprocessor for acceleration and high during the remaining operation cycle. Thereby cycle, thereby informing the microprocessor of a motor failure.

DRIVER OPERATION

Figure 3:
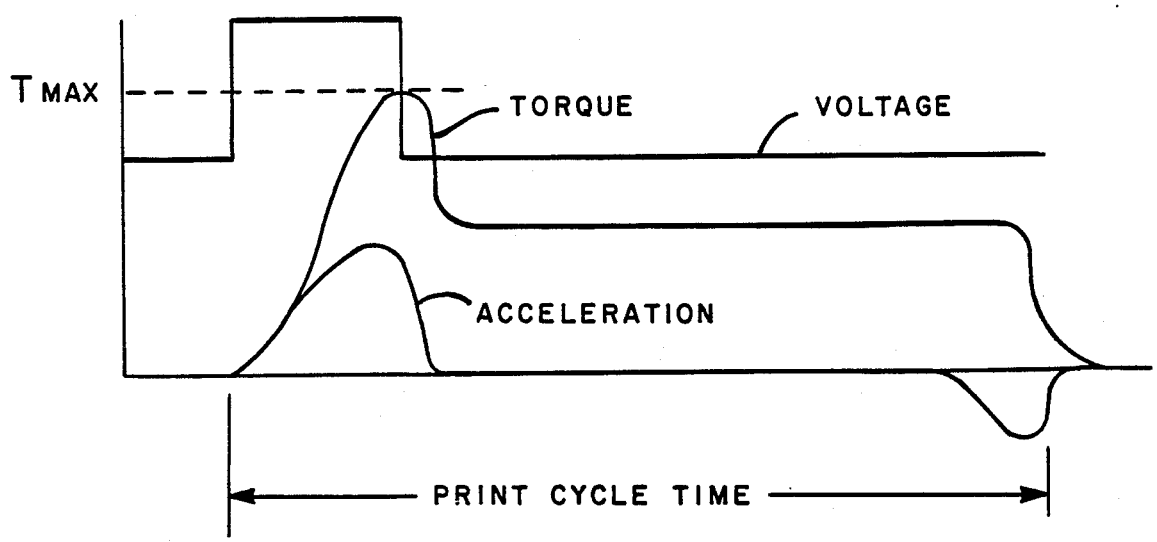
FIG. 3 is a graphic representation of the torque, acceleration and voltage delivery profiles of stepper motor under the influence of a microprocessor instructed driver circuit in accordance with the present invention.

Referring to FIG. 3, the microcomputer can be programed such that at time zero the microcomputer causes the optical isolator 40 to be turned "OFF" and thereby causing the current delivered to the stepper motor terminals ST1 and ST6 to go high current rate in a manner as afore described. The microprocessor maintains the high current throughout the stepping of the stepper motor during the acceleration range. When the stepper motor has been accelerated to the desired velocity, the microprocessor then turns "ON" the optical isolator 40 to thereby lower the reference voltage applied to comparators 46 and 48 and cause the appropriate comparator to be triggered "OFF" by the voltage across respective resistors R4 and R5 (lines 41 and 42). This causes a respective line 54, 56 to go low and reset the CLR input of the appropriate flip-flop. This in turn causes the current supplied at stepper motors terminals ST1 and ST6 to go low current rate in the manner as aforedescribed while maintaining the appropriate velocity of the stepper motor. It is noted that the corresponding torque delivered by the stepper motor during acceleration rises sharply beyond the rated torque level of the stepper motor. Once the stepper motor has achieved the goal speed, the microprocessor causes the driver circuit to switch to the low current which drops the torque output to the rated level. It has been observed that where the stepper motor is overdriven for a short period on the order of 15 milliseconds, such as, in postage meter mailing machine operation, the stepper motor's performance life has not been adversely affected.

The afore description represents the preferred embodiment of the invention and should not be viewed as limiting. The scope of the invention is presented in the following claims.

What is claimed is:

1. A driver circuit for driving a stepper motor under the control of a microprocessor, said stepper motor having coils, said driver circuit being coupled to selectively energize said coils with a low steady state voltage/current and a high steady state voltage/current, said driver circuit having means for receiving a series of step commands from said microprocessor and in response thereto energizing a respective one or ones of said coils of said stepper motor with said low voltage/current or with said high voltage/current;

said driver circuit having gating circuit means responsive to said microprocessor for selectively energizing a respective coil or coils with said low voltage/current when said gating circuit is in a turned-off state or energizing a respective coil or coils with said high voltage/current when said gating circuit is in a turned-on state;

said driver circuit including informing means for informating the microprocessor of failure of said stepper motor, said informing means comprising said gating circuit means having a line in informing communication with said microprocessor such that when there is no motor failure and said gating circuit is in a turned-off state, a first voltage is delivered to said microprocessor and when there is no motor failure and said gating circuit is in a turned-on state, a second voltage is delivered to said microprocessor; and such that when there is a motor failure and said gating circuit is in a turned-off state, said second voltage is delivered to said microprocessor and when there is a motor failure and said gating circuit is in a turned-on state, said first voltage is delivered to said microprocessor.

2. A driver circuit for driving a stepper motor under control of a microprocessor or the like, said motor including a plurality of coils, said driver circuit being coupled to receive at least a higher voltage and a lower voltage, step commands from said microprocessor for directing selective energization of said coils, and a voltage level command from said microprocessor for directing selective application at least of said higher voltage to said motor, said driver circuit comprising:

gating circuit means coupled to receive said higher and lower voltages and coupled to receive said step commands and said voltage level command, and in response thereto to cause selective energization of said coils of said stepper motor and selective application at least of said higher voltage to said motor; and informing means coupled to said motor to receive at least one signal relating to a voltage or current thereof and to said gating circuit means to receive at least one signal related to said step commands and said voltage level command, and in response thereto to provide a signal for informing said microprocessor as to whether said motor has failed at least under application of said higher voltage to said motor.

3. A driver circuit according to claim 2 wherein said informing means comprises logic circuitry having an output line on which said signal for informing said microprocessor is provided as a selected logic state.

4. A driver circuit for driving a stepper motor under control of a microprocessor or the like, said motor including a plurality of coils, said driver circuit being coupled to receive at least a higher voltage and a lower voltage, step commands from said microprocessor for directing selective energization of said coils, and a voltage level command from said microprocessor for directing selective application at least of said higher voltage to said motor, said driver circuit comprising:

first gating circuit means coupled to receive said lower voltage and coupled to receive said step commands, and in response thereto to cause energization of selected coils of said stepper motor by said lower voltage;

second gating circuit means coupled to receive said higher voltage and said voltage level command, and coupled to said first gating means for receiving signals related to said step commands, and in response thereto to selectively apply to said stepper motor said higher voltage; and means coupled to said second gating means and to said motor for sensing the current in said motor and in response to a sensed current above a preselected level conditioning said second gating means against application of said higher voltage to said motor.

5. The driver circuit according to claim 4 wherein said means for sensing includes means for changing said preselected level from a lower level to a higher level when said voltage level command directs the application of said higher voltage, and from said higher level to said lower in the absence of said voltage level command which directs application of said higher voltage.

6. The driver circuit according to claim 4 including informing means coupled to said means for sensing for receiving a signal directing said conditioning of said second gating means, and coupled to said first and second gating circuit means to receive at least one signal related to said step commands and said voltage level command, and in response thereto providing a signal for informing said microprocessor as to whether said motor has failed at least under application of said higher voltage to said motor.

* * * * *